(No Model.)

G. W. DUGGER.
COTTON CHOPPER.

No. 266,788. Patented Oct. 31, 1882.

WITNESSES:
Theo. G. Hoster
C. Sedgwick

INVENTOR:
G. W. Dugger
BY Munn & Co
ATTORNEYS.

UNITED STATES PATENT OFFICE.

GREENE W. DUGGER, OF GREENSBOROUGH, ALABAMA.

COTTON-CHOPPER.

SPECIFICATION forming part of Letters Patent No. 266,788, dated October 31, 1882.

Application filed March 29, 1882. (No model.)

*To all whom it may concern:*

Be it known that I, GREENE W. DUGGER, of Greensborough, in the county of Hale and State of Alabama, have invented a new and Improved Cotton-Chopper, of which the following is a full, clear, and exact description.

This invention consists of an improved chopping and hoeing or cultivating machine, in which it is sought to provide simple and efficient means for regulating and adjusting the chopper and hoes or plows, both for working together or separately, also to provide for the protection of the same from injury by obstructions, all as hereinafter described.

Reference is to be had to the accompanying drawings, forming part of this specification, in which similar letters of reference indicate corresponding parts in all the figures.

Figure 1:
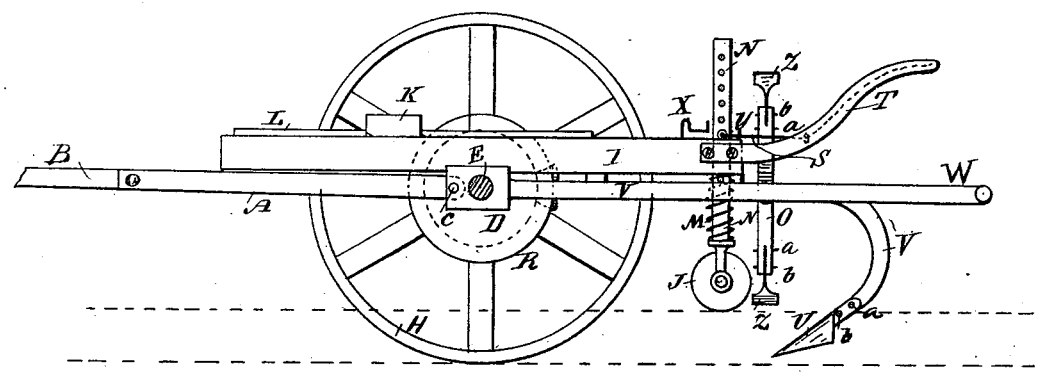
Figure 2:
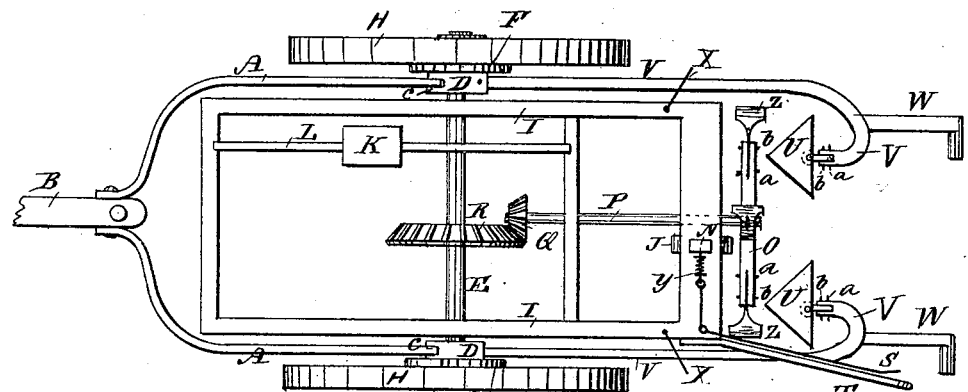
Figure 3:
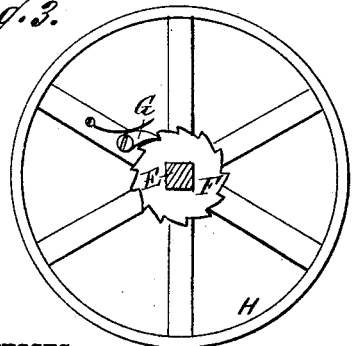
Figure 4:
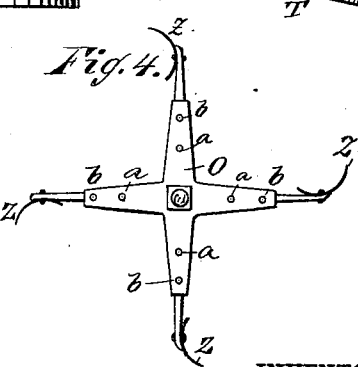

Figure 1 is an elevation of the machine with one of the wheels removed, the axle being sectioned just inside of the wheel. Fig. 2 is a plan view. Fig. 3 is a section of the axle and elevation of a wheel, showing the ratchet connection of the wheels to the axle, employed to allow the machine to back without revolving the chopper. Fig. 4 is a side elevation of the chopper detached from the machine.

A represents the yoke-frame, by which the tongue B is attached, said yoke being pivoted at $c$ to the bearing-blocks D, mounted on the axle E, and in which the axle is made to revolve for rotating the chopper by means of the ratchets F and pawls G, the former attached to the axle and the latter to the wheels H, so as only to turn the axle when going forward.

I represents the chopper-supporting frame, mounted near about its middle on the axle, with a gaging-roller, J, at the rear and a counterbalance-weight, K, fixed to slide along a bar, L, in advance of the axle, for use in connection with a spring, M, for lessening the weight of the chopper-frame on the gage-wheel in case it cuts too deep in the ground.

The chopper O is mounted on the rear end of shaft P and overhangs the rear end of frame I. The shaft P extends forward near the axle and gears by a bevel-pinion, Q, with the bevel driving-wheel R on the axle.

The depth of the cutting of the chopper is regulated by the spring M, on the standard N of the gage-wheel, and the spring-pin Y.

By depressing the frame I and allowing the pin to engage the standard the gage-wheel may be set at any desired height.

A lever, S, is connected with said pin for withdrawing it and for adjusting the frame, said lever being arranged alongside of the handle T, attached to frame I, for convenience in adjusting it.

U represents the cultivator plows or hoes. They are attached to the curved beams V, which connect to the machine by the bearing-blocks D on the axle, and they have a branch, W, forming a handle, by which to control them. The blocks are so connected to the tongue-yoke A by pivots that they allow the plows to rise and fall sufficiently for working properly, and for being lifted out of the ground and lodged on rests X when it is not desired to have them work.

Both the plows and the chopper-cutters Z are connected by their shanks to the stocks by a metal pin, $a$, and a wood pin, $b$, so that in case they encounter an obstruction too great for them to overcome with safety to them and the stocks the wood pins will break and allow them to swing back on the metal pins, and thus escape the damage they would otherwise suffer.

The gage-wheel and chopper can be raised out of working position by shifting the counterbalance-weight K forward on bar L to tilt frame I on the axle and raise its rear end sufficiently to lift the gage-wheel and chopper from the soil, after which adjustment the machine may be operated to use the plows alone, as will be readily understood, the gears Q R being meanwhile disconnected by any suitable means to avoid unnecessary wear of the parts and promote lightness of draft.

The plow-beams V have a lateral movement in the bearing-blocks D sufficient to laterally adjust the plows as may be desired. The pawls G may also be held away from ratchets F by any suitable detents, which will permit the wheels H to turn freely on axle E for moving the machine about from place to place without revolving the axle to unnecessarily actuate the chopping mechanism.

Having thus fully described my invention, I claim as new and desire to secure by Letters Patent—

1. The combination, with the axle, of the chopper-supporting frame I, mounted at its middle on the axle, provided with a gage-roller, J, at the rear, and having a sliding counter-balance in front on the bar L, as shown and described.

2. The combination, with the depressible frame I and gage-wheel J, having a standard, N, of the spring M and the spring-pin Y, adapted to be entered in one of several holes in the standard N, as and for the purpose specified.

GREENE W. DUGGER.

Witnesses:
W. D. LEE,
R. B. DUGGER.